United States Patent
Bazzi et al.

(10) Patent No.: US 10,873,405 B2
(45) Date of Patent: Dec. 22, 2020

(54) METHOD FOR OBTAINING UPLINK CALIBRATION VALUES, CALIBRATION METHOD, AND CORRESPONDING TERMINAL AND BASE STATION

(71) Applicant: HUAWEI TECHNOLOGIES DUESSELDORF GMBH, Duesseldorf (DE)

(72) Inventors: Samer Bazzi, Munich (DE); Wen Xu, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 29 days.

(21) Appl. No.: 16/251,739

(22) Filed: Jan. 18, 2019

(65) Prior Publication Data

US 2019/0158195 A1 May 23, 2019

Related U.S. Application Data

(63) Continuation of application No. PCT/EP2016/067496, filed on Jul. 22, 2016.

(51) Int. Cl.
*H04W 4/00* (2018.01)
*H04B 17/21* (2015.01)
(Continued)

(52) U.S. Cl.
CPC .......... *H04B 17/21* (2015.01); *H04B 7/0417* (2013.01); *H04B 7/061* (2013.01); *H04B 7/0617* (2013.01);
(Continued)

(58) Field of Classification Search
CPC ...... H04B 17/21; H04B 17/24; H04B 17/327; H04B 7/061; H04L 25/0202; H04L 1/00; H04L 27/2655

See application file for complete search history.

(56) References Cited

U.S. PATENT DOCUMENTS

| 2007/0206504 | A1* | 9/2007 | Koo | .................... | H04L 25/0242 370/245 |
| 2012/0082274 | A1* | 4/2012 | Bury | ................... | H04L 27/2647 375/346 |

(Continued)

OTHER PUBLICATIONS

Rogalin, et al., "Hardware-Impairment Compensation for Enabling Distributed Large-Scale MIMO", Information Theory and Applications Workshop (ITA), IEEE, pp. 1-10 (2013).

*Primary Examiner* — Abdelnabi O Musa
(74) *Attorney, Agent, or Firm* — Leydig, Voit & Mayer, Ltd.

(57) ABSTRACT

A method for obtaining uplink calibration values in a terminal of a wireless communication system is provided, in order to enable a Base Station (BS) having a number of antennas to determine a respective hardware chain value for each antenna of the number of antennas, said method comprising calculating, by the terminal, an uplink calibration value for each antenna on the basis of a downlink channel estimate value for each antenna and a normalization value obtained from said downlink channel estimate values, and sending transmitting, by the terminal, the calculated uplink calibration value for each antenna to the BS. A corresponding terminal for a wireless communication system, adapted to obtain uplink calibration values, is also provided.

20 Claims, 2 Drawing Sheets

(51) Int. Cl.
*H04B 7/06* (2006.01)
*H04B 7/0417* (2017.01)
*H04B 17/24* (2015.01)
*H04B 17/327* (2015.01)
*H04L 25/02* (2006.01)

(52) U.S. Cl.
CPC .......... *H04B 17/24* (2015.01); *H04B 17/327* (2015.01); *H04L 25/0202* (2013.01)

(56) References Cited

U.S. PATENT DOCUMENTS

| | | | | |
|---|---|---|---|---|
| 2012/0176928 A1* | 7/2012 | Wallace | H04B 7/0669 | 370/252 |
| 2012/0300864 A1* | 11/2012 | Merlin | H04B 7/0857 | 375/260 |
| 2015/0341096 A1* | 11/2015 | Gao | H04B 1/56 | 370/278 |

* cited by examiner

METHOD FOR OBTAINING UPLINK CALIBRATION VALUES, CALIBRATION METHOD, AND CORRESPONDING TERMINAL AND BASE STATION

CROSS-REFERENCE TO RELATED APPLICATIONS

This application is a continuation of International Application No. PCT/EP2016/067496, filed on Jul. 22, 2016. The disclosures of all of the aforementioned patent applications are hereby incorporated by reference in their entireties.

FIELD OF THE INVENTION

Embodiments of the present invention refer to a method for obtaining uplink calibration values in a terminal of a wireless communication system in order to enable a base station (BS) having a number of antennas to determine a respective hardware chain value for each antenna of the number of antennas. Embodiments of the present invention further refer to a calibration method for determining hardware chain values in a base station (BS) having a number of antennas, wherein a respective hardware chain value for each antenna of the number of antennas is obtained. Embodiments of the present invention further refer to a corresponding terminal for a wireless communication system and a base station.

Embodiments of the present invention specifically refer to multiple-input, multiple-output (MIMO) systems and the corresponding terminals and base stations as well as the functionalities and methods performed in the respective base stations and mobile terminals of such MIMO systems.

BACKGROUND

One of the main challenges in MIMO systems is to acquire accurate downlink, DL, channel state information (CSI) at a base station (BS) in order to perform precoding and to support multiple users, i.e. mobile terminals, on the same time-frequency resources. The term MIMO system in the frame of the present invention is hereby intended to define any kind of wireless communication system comprising base stations and mobile terminals, wherein at least the base stations operate on the basis of MIMO technology. This may include also systems in which also the mobile terminals operate on the basis of MIMO technology. Also, this applies to any type of past wireless communication systems, such as GSM, UMTS communication systems or any other known communication systems, as well as future wireless communication systems, such as fifth generation, 5G, systems. Also, the invention specifically also applies to massive MIMO systems. The above discussed acquisition of accurate DL-CSI at a base station is, in practical time-division-duplex (TDD) systems, performed by sending predefined signals, such as pilot signals or pilot sequences from the user terminals to the base stations, which use the received signals for channel estimation. In time-division-duplex (TDD) systems, and due to channel reciprocity, the DL- and uplink, UL-CSI are identical within a given coherence interval. Thus, a BS can estimate the DL-CSI via UL pilots sent by the user equipments (UEs).

While the wireless channel reciprocity holds for TDD systems, a complete channel reciprocity does not hold in every case. This is due to the fact that the transmit hardware chain gains and the receive hardware chain gains in a BS are to be considered as a part of the effective DL or UL channel. As these hardware chains usually have different gains, the reciprocity is violated. As a result, the DL-CSI cannot be obtained from UL pilots and the theoretically possible TDD MIMO gains cannot be exploited.

The present invention also applies to frequency-division-duplex (FDD) systems. In this context, the BS can estimate the DL channel covariance matrix of a given user terminal via uplink signals sent by the latter. This is usually referred to as "FDD long term reciprocity." Similar to the problem occurring in TDD systems, the channel covariance estimate in FDD systems is not accurate, unless the hardware chain gain values are estimated and compensated.

SUMMARY

The object of the present invention is to provide a simple but reliable way to obtain uplink calibration values in a terminal of a wireless MIMO communication system and a corresponding simple but reliable way to calibrate hardware chains in a base station of the wireless MIMO communication system.

The above object is achieved by the subject matter of the independent claims. Advantages features are defined in the respective dependent claims.

A first aspect of the present invention provides a method for obtaining uplink calibration values in a terminal of a wireless communication system in order to enable a Base Station, BS, having a number of antennas to determine a respective hardware chain value for each antenna of the number of antennas, said method comprising the steps of calculating, by the terminal, an uplink calibration value for each antenna on the basis of a downlink channel estimate value for each antenna and a normalization value obtained from said downlink channel estimate values, and sending, by the terminal, the calculated uplink calibration value for each antenna to the BS.

In a first implementation form of the first aspect of the present invention as such, the terminal obtains a downlink channel estimate value for each antenna and determines a downlink channel estimate value with the lowest signal power to calculate said normalization value.

In a second implementation form according to the first implementation form of the first aspect, the terminal receives a pilot signal on a downlink channel for each antenna from the BS, and the terminal obtains said downlink channel estimate value for each antenna from the received respective pilot signal.

In a third implementation form according to the first or the second implementation form of the first aspect, said normalization value is calculated by the terminal as a function of the maximum transmit power of the terminal and said downlink channel estimate value with the lowest power.

In a fourth implementation form according to the third implementation form of the first aspect, the terminal calculates said normalization value by multiplying the maximum transmit power of the terminal with a value obtained from said downlink channel estimate value with the lowest power.

In a fifth implementation form according to the fourth implementation form of the first aspect, the terminal calculates said value as the squared absolute value of said downlink channel estimate value with the lowest power.

In a sixth implementation form according to one of the second to fifth implementation forms of the first aspect, the terminal calculates the uplink calibration values for each antenna by multiplying a normalization factor with the inverse of the respective downlink channel estimate value for each antenna, wherein the normalization factor is the square root of said normalization value.

In a seventh implementation form according to one of the second to sixth implementation forms of the first aspect, said normalization value is the same normalization value for all antennas in said BS.

In an eight implementation form according to one of the second to sixth implementation forms of the first aspect, said antennas of said BS are divided into a number of groups, and the terminal calculates a different normalization value for each group, and signals the obtained normalization values to the BS, which calculates the respective hardware chain value for each antenna from the received respective uplink calibration signal and the respective normalization value.

A ninth implementation form of the first aspect as such or according to one of the first to eight implementation forms of the first aspect further comprises the steps of receiving, by the BS, an uplink calibration signal for each antenna from said terminal, said uplink calibration signal comprising said uplink calibration value for each antenna, and processing, by the BS, each received uplink calibration signal into a respective hardware chain value for each antenna.

A second aspect of the present invention provides a terminal for a wireless communication system, adapted to obtain uplink calibration values in order to enable a Base Station, BS, having a number of antennas to determine a respective hardware chain value for each antenna of the number of antennas, comprising calculating means for calculating an uplink calibration value for each antenna on the basis of a downlink channel estimate value for each antenna and a normalization value obtained from said downlink channel estimate values, and transmitting means for sending the calculated uplink calibration value for each antenna to the BS.

In a first implementation form of the second aspect of the present invention as such, the terminal obtains a downlink channel estimate value for each antenna and determines a downlink channel estimate value with the lowest signal power to calculate said normalization value In a second implementation form according to first implementation form of the second aspect, a receiving means of the terminal is adapted to receive a pilot signal on a downlink channel for each antenna from the BS, and the calculating means is adapted to obtain said downlink channel estimate value for each antenna from the received respective pilot signal.

In a third implementation form according to the first or the second implementation form of the second aspect, said calculating means is adapted to calculate said normalization value as a function of the maximum transmit power of the terminal and said downlink channel estimate value with the lowest power.

In a fourth implementation form according to the third implementation form of the second aspect, said calculating means is adapted to calculate said normalization value by multiplying the maximum transmit power of the terminal with a value obtained from said downlink channel estimate value with the lowest power.

In a fifth implementation form according to the fourth implementation form of the second aspect, said calculating means is adapted to calculate said value as the squared absolute value of said downlink channel estimate value with the lowest power.

In a sixth implementation form according to one of the second to fifth implementation forms of the second aspect, said calculating means is adapted to calculate the uplink calibration values for each antenna by multiplying a normalization factor with the inverse of the respective downlink channel estimate value for each antenna, wherein the normalization factor is the square root of said normalization value.

In a seventh implementation form according to one of the second to sixth implementation forms of the second aspect, said normalization value is the same normalization value for all antennas in said BS.

In an eight implementation form according to one of the second to sixth implementation forms of the second aspect, said antennas of said BS are divided into a number of groups, and said calculating means is adapted to calculate a different normalization value for each group, and said transmitting means is adapted to signal the obtained normalization values to the BS, which calculates the respective hardware chain value for each antenna from the received respective uplink calibration signal and the respective normalization value.

In a ninth implementation form of the second aspect of the present invention as such or according to one of the first to eight implementation forms of the second aspect, said terminal is a User equipment, UE, for a said wireless communication system.

In an tenth implementation form of the second aspect of the present invention as such or according to one of the first to eight implementation forms of the second aspect, said terminal is either integrated into said BS or co-located with said BS and exclusively adapted to obtain said uplink calibration values.

A third aspect of the present invention provides a base station, BS, having a number of antennas divided into a number of groups of antennas, comprising receiving means adapted to receive an uplink calibration signal from a terminal, said uplink calibration signal comprising an uplink calibration value for each antenna and a normalization value for each antenna group, and processing means adapted to process each received uplink calibration value and each received normalization value into a respective hardware chain value for each antenna of the number of antennas.

In an implementation form according to the third aspect as such, said antennas of said BS are divided into a number of groups, and said receiving means is adapted to receive a different normalization value for each group, and said processing means is adapted to calculate the respective hardware chain value for each antenna from the received respective uplink calibration signal and the received respective normalization value.

A fourth aspect of the present invention provides wireless communication system which comprises a base station, BS, according to the third aspect of the present invention and a terminal according to the second aspect as such or according to one of the implementation forms of the second aspect.

A fifth aspect of the present invention provides a calibration method for determining hardware chain values in a Base Station, BS, having a number of antennas grouped in a number of groups, wherein a respective hardware chain value for each antenna of the number of antennas is obtained, said method comprising the steps of receiving, by the BS, an uplink calibration signal from a terminal, said uplink calibration signal comprising an uplink calibration value for each antenna and a normalization value for each group of antennas, and processing, by the BS, each received uplink calibration value and each received normalization value into a respective hardware chain value for each antenna.

In an implementation form according to the fifth aspect as such, said antennas of said BS are divided into a number of groups, and said step of receiving comprises receiving, by the BS, a different normalization value for each group, and the step of processing comprises processing, by the BS, each received respective uplink calibration value and each received respective normalization value into the respective hardware chain value for each antenna.

The various aspects of the present invention and their various implementation forms provide a simple way to obtain, i.e. calculate, uplink calibration values in a terminal of a wireless communication system in order to enable a BS having a number of antennas to determine a respective hardware chain value for each antenna in the BS, and thus a simple and accurate calibration functionality for calibrating and determining hardware chain values for each antenna in the BS. In other words, a simple over-the-air (OtA) technology to calibrate the BS hardware chain gains is proposed. The invention is based on a DL and a following UL signaling procedure. The terminal first estimates the DL channel of each BS antenna and then sends, in the UL, normalized values of the estimated DL channels. The UL signals obtained in the BS allow the calibration of the BS hardware chains for each antenna. The advantages as compared to prior art solutions are a considerably improved calibration accuracy and consequently more efficient control of the MIMO gains. Also, the present invention allows for transmission of higher order modulations schemes, such as for example 256 QAM. Also, the present inventions allows a rather cost efficient implementation in terms of hardware functionalities, as well as signaling overhead.

Generally it has to be noted that all terminals, user equipments, base stations, systems, elements, units and means and so forth, which are used to describe aspects, implementations, embodiments and so forth of the present application could be implemented by software or hardware elements or any kinds of combination thereof. All steps and functionalities which are performed by the various entities described in the present application are intended to mean that the respective entity is adapted to or configured to perform the respective steps or functionalities. Even if in the following description of specific embodiments, a specific functionality or step to be performed by a general entity is not reflected in the description of a specific detailed element of that entity which performs that specific step or functionality, it should be clear for a skilled person that these elements and functionalities can implemented in the respective hardware or software elements or any kind of combination thereof. Further, the methods of the various aspects, implementation forms and embodiments and the various steps are embodied in the functionalities of the various described apparatus elements. In turn, the functionalities of the terminals, user equipments, base stations and systems of the various aspects, implementation forms and embodiments of the present invention are reflected by the description of the various respective method steps where applicable.

BRIEF DESCRIPTION OF DRAWINGS

The above described aspects and implementation forms of the present invention will be explained in the following description of specific embodiments in relation to the enclosed drawings, in which.

DETAILED DESCRIPTION OF THE EMBODIMENT

Figure 1:
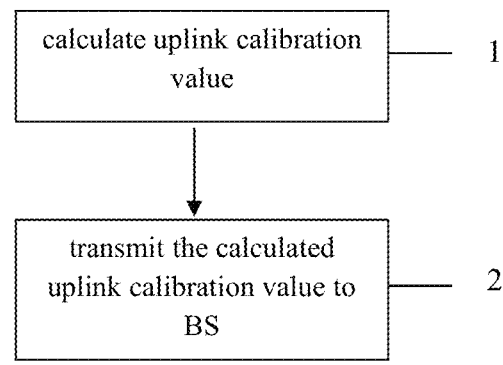
FIG. 1 shows a schematic diagram of a first method embodiment of the present invention.

FIG. 1 shows a schematic diagram of a first method embodiment of the present invention. The method of the first method embodiment is a method performed by a terminal for obtaining uplink calibration values in a terminal of a wireless communication system in order to enable a base station, BS, having a number of antennas to determine a respective hardware chain value for each antenna of the number of antennas of the BS, wherein the method comprises the steps of calculating 1, by the terminal, an and uplink calibration value for each antenna of the BS on the basis of a downlink channel estimate value for each antenna of the BS and a normalization value obtained from that downlink channel estimation values, and transmitting 2, by the terminal, the calculated uplink calibration value for each antenna to the BS. The terminal can for example be the terminal 10 which is described in the first apparatus embodiment of FIG. 3. The base station could for example be a base station 20 as described in the second apparatus embodiment of FIG. 4.

In an optional sub-step of the calculating step 1, the terminal obtains a downlink channel estimate value for each antenna of the BS and determines a downlink channel estimate value with the lowest signal power to calculate said normalization value. Hereby, in a further optional sub-step, the terminal receives a pilot signal on a downlink channel for each antenna from the BS, and the terminal obtains said downlink channel estimate value for each antenna from the received respective pilot signal. In a further optional sub-step to the above described sub-steps, the normalization value is calculated by the terminal as a function of the maximum transmit power of the terminal and said downlink channel estimate value with the lowest power. In a further optional sub-step, the terminal calculates said normalization value by multiplying the maximum transmit power of the terminal with a value obtained from said downlink channel estimate value with the lowest power. In a further optional sub-step, the terminal calculates said value as the squared absolute value of said downlink channel estimate value with the lowest power. In a further optional sub-step, the terminal calculates the uplink calibration values for each antenna by multiplying a normalization factor with the inverse of the respective downlink channel estimate value for each antenna, wherein the normalization factor is the square root of said normalization value. In an implementation example, the normalization value is the same normalization value for all antennas in said BS. Alternatively, the antennas of the BS are divided into a number or groups, and the terminal calculates a different normalization value for each group, and signals the obtained normalization values to the BS, which calculates the respective hardware chain value for each antenna from the received respective uplink calibration signal and the respective normalization value.

Figure 3:
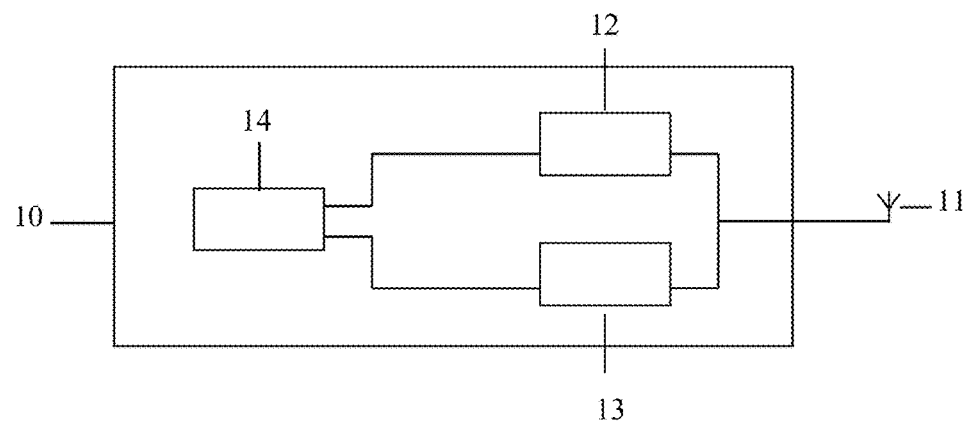
FIG. 3 shows a schematic diagram of a first apparatus embodiment of the present invention.

The schematic diagram of FIG. 3 shows a first apparatus embodiment with a terminal 10. The functionalities of the terminal 10 correspond to the method steps and sub-steps described in relation to the first method embodiment of FIG. 1. As shown in the FIG. 3, the terminal 10 comprises an antenna 11 for transmitting and receiving signals in the wireless MIMO communication system. Hereby, the terminal 10 comprises a processing means 14 which comprises and implements all the functionalities for calculating and obtaining an uplink calibration value for each antenna of the base station of the wireless communication system, as described in relation to the first method embodiment of FIG. 1. This processing means 14 is connected with corresponding receiving means 12 and transmitting means 13, which are connected to the antenna 11, in order to enable the terminal 10 to transmit signals to and receive signals from the base station of the communication system. The receiving means 12 and the transmitting means 13 implement all the necessary functionalities for receiving and transmitting signals with the base station.

Figure 2:
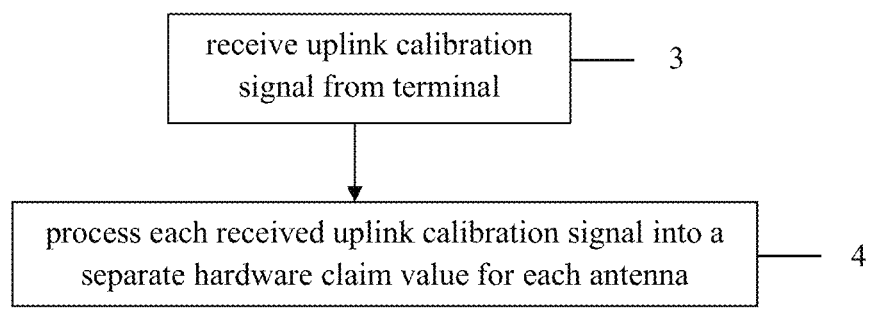
FIG. 2 shows a schematic diagram of a second method embodiment of the present invention.
Figure 4:
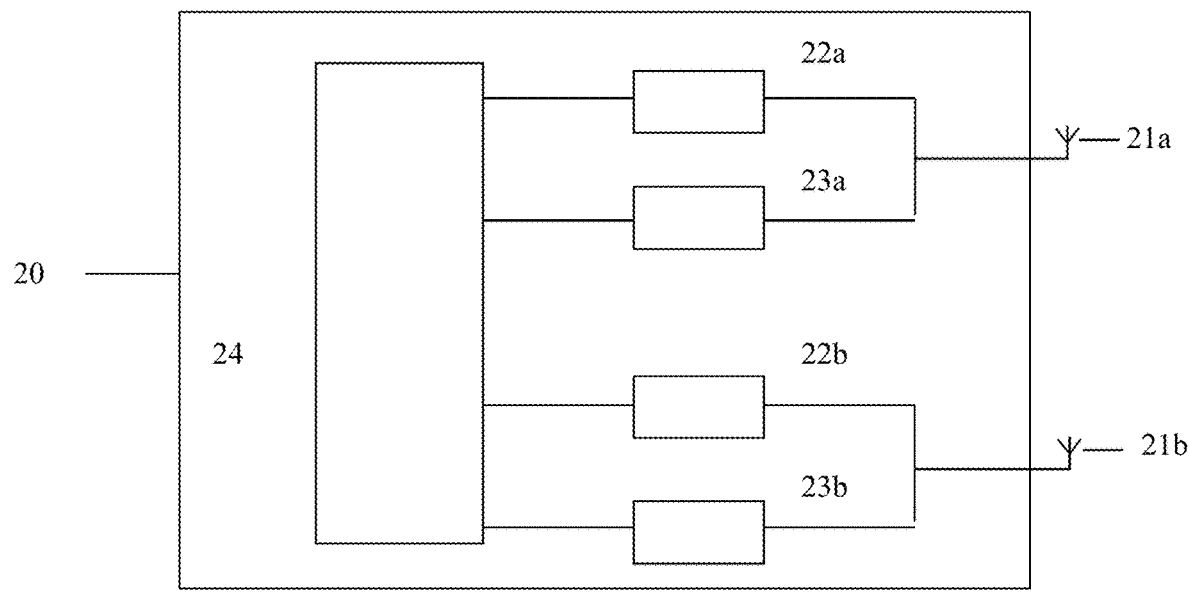
FIG. 4 shows a schematic diagram of a second apparatus embodiment of the present invention.

FIG. 2 shows a schematic diagram of a second method embodiment, which is a calibration method performed in a base station for determining hardware chain values in a base station, BS, such as for example the base station 20 of the second apparatus embodiment of FIG. 4, which has antennas 21a, 21b, wherein a respective hardware chain value for each antenna 21a, 21b is obtained, wherein the calibration method comprises the steps of receiving 3, by the BS 20, an uplink calibration signal for each antenna from a terminal (for example the terminal 10 of the first apparatus embodiment of FIG. 3), said uplink calibration signal comprising an uplink calibration value for each antenna 21a, 21b, and processing 4, by the BS 20, each received uplink calibration value into a respective hardware chain value for each antenna.

FIG. 4 shows the corresponding second apparatus embodiment of a corresponding base station 20, which comprises a number of antennas 21a and 21b. In the shown example, only two antennas 21a and 21b are shown, but it should be clear that the base station 20 can comprise any kind of antenna arrangement comprising any suitable number of antennas or antenna elements necessary for the respective implementation of the MIMO functionalities. The base station 20 comprises a processing means 24 adapted to perform all the necessary calculation functionalities which will be described in further detail below in order to obtain the hardware chain values on the basis of the uplink calibration signals received from the terminal 10. Also, the base station 20 comprises, for each antenna 21a, 21b, a respective receiving means 22a, 22b and transmitting means 23a, 23b which enable the base station 20 to receive signals from and transmit signals to the terminal 10 via the respective antenna 21a, 21b.

In the following, a detailed example for an implementation of the first and second method embodiment is presented. The respective functionalities are implemented for example by the respective entities of the first and second apparatus embodiment.

Consider a single-cell scenario where a BS (e.g. the BS 20) with M antennas (e.g. antennas 21a, 21b) serves K≤M non-cooperating UEs (e.g. terminal 10) with single-antennas (e.g. antenna 11) in TDD mode. The UL channel matrix is denoted by $HU \in \mathbb{C}^{M \times K}$, while the DL channel matrix is denoted by $HD \in \mathbb{C}^{K \times M}$. The relation between HD and HU reads $$HD = \Omega - 1 HU \Psi \qquad (1)$$

where $\Psi$ is the effective BS hardware chains diagonal matrix consisting of amplitude and phase distortions over the M antennas 21a, 21b, which are independent of the channel. The phase and amplitude distortions at a given antenna 21a, 21b are independent of each other and of the distortions occurring at other antennas. Similarly, $\Omega$ is the diagonal UE hardware chains matrix consisting of amplitude and phase distortions over the K UEs 10.

Calibration methods aim at estimating $\Psi$ and $\Omega$ so that the DL channel can be obtained from the estimated UL channel. However, as long as the UEs are not involved in closed-loop processing, the effective hardware chain coefficient of each UE constitutes a unique complex scalar that is part of the DL channel seen by the UE. Therefore, it is automatically estimated and compensated by e.g., an MMSE receive filter when data demodulation is performed. Therefore, it is enough to get an accurate estimate of $\Psi$ at the BS to enable TDD channel reciprocity.

Proposed Calibration Procedure: Part I

The proposed procedure is to be performed between the BS 20 and a dedicated UE 10 experiencing a high SNR. For the MISO case involving the dedicated UE 10, (1) simplifies to $$hD, de = \Psi hU, de/ade$$

where ade is the complex coefficient denoting the effective hardware chain gain of the dedicated UE 10. The following DL and UL phases are to be performed.

DL Phase:

The m-th BS antenna 21a, 21b sends a unit norm pilot pDL, de, m to the dedicated UE 10. For simplicity, the BS transmission power in the DL calibration phase is normalized to one. The received signal at the UE 10 reads $$yDL, de, m = hDL, de, m\, pDL, de, m + nDL, de \qquad (2)$$

where hDL, de, m and nDL, de denote the DL channel between the dedicated UE 10 and the m-th BS antenna 21a, 21b and the DL additive noise at the dedicated UE 10. Applying least-squares channel estimation for instance, the UE 10 obtains (e.g. by the processing/calculating means 14) the channel estimate $$\hat{h}DL, de, m = yDL, de, m\, pDL, de, m^* = hDL, de, m + pDL, de, m^* nDL, de.$$

The transmit SNR in the DL calibration phase equals SNRDL, ca=1/E[|nDL, de|2].

UL Phase:

After the DL phase is over, the UE 10 has the M DL channel estimates (calculated by the processing/calculating means 14). The UE 10 sends, in the UL, normalized inverses of the obtained DL channel estimates to the BS 10 so that the latter can estimate $\Psi$. Denote the DL estimated channel with the smallest (worst case) norm by $\hat{h}DL, wc$. In other words, $1/\hat{h}DL, wc$ has the largest norm. Further, let sqrt ($\alpha wc$), the square root of $\alpha wc$, be the power normalization factor of $1/\hat{h}DL, wc$. Note that $\alpha wc = Etx, de, UE|\hat{h}DL, wc|2$ where Etx, de, UE is the maximum transmit power of the dedicated UE 10.

The UL normalizes all UL data by sqrt ($\alpha wc$). The UL signal sent to the m-th BS antenna 21a, 21b then reads $$dUL, de, m = \text{sqrt}(\alpha wc)/\hat{h}DL, de, m.$$

Correspondingly, the received UL signal at the m-th BS antenna 21a, 21b reads $$yUL, de, m = dUL, de, m\, hUL, de, m + nUL, de, m = \text{sqrt}(\alpha wc)$$
$$hUL, de, m/\hat{h}DL, de, m + nUL, de, m$$

where hUL, de, m and nUL, de, m denote the UL channel between the dedicated UE 10 and the m-th BS antenna 21a, 21b and the UL additive noise at the m-th BS antenna 21a, 21b.

The transmit SNR in the UL calibration phase reads SNRUL,ca=Etx,de,UE/E [|nUL, de, m|2] where for simplicity the same noise variance across all BS antennas 21a, 21b is assumed.

Assuming the physical channel has not changed after the DL and UL phases, the BS 20 estimates (in the processing/calculating means 24) the (m,m)th entry of $\Psi$ as $[\Psi est]mm=1/yUL,de,m$. Furthermore, for high SNRUL, ca and SNRDL, ca values, we have $\Psi est \approx \Psi/(sqrt(\alpha wc)\ ade)$. A unique multiplicative error does not ruin MIMO multiplexing gains. Therefore, the proposed method results in successful calibration of the BS hardware chains at high SNR.

To sum up, normalizing by the worst case estimated channel power results in Test being a scaled version of $\Psi$ and enables the calibration of the BS hardware chains. However, this comes at the expense of transmit power reduction. Namely, the worst case inverse channel is sent with the maximum transmit power Etx, de, UE, while all other inverse channels are sent with less power, resulting in a reduction of calibration accuracy. Furthermore, in massive MIMO scenarios (M>>1) and/or scenarios with short coherence times, the physical channel might have changed after the DL calibration phase; thus, the proposed method will suffer from further performance degradations.

Proposed Calibration Procedure: Part II

Above shortcomings can be circumvented by the idea of antenna grouping. Namely, the M BS antennas 21a, 21b are divided into G groups and the proposed procedure is repeated on a group basis. For the antenna group g, let the normalizing constant based on the worst-case (i.e., smallest) channel power in the group be $\alpha wc,g$. In addition to sending normalized inverse DL channel estimates, the UE 10 feeds back (i.e. signals) the set $\{\alpha wc,1, \alpha wc,2, \ldots, \alpha wc,G\}$ to the BS 20. Assuming antenna m belongs to group g, the sent UL signal to the m-th antenna 21a reads $$dUL,de,m=sqrt(\alpha wc,g)/\hat{h}DL,de,m$$

while the received signal at the m-th BS antenna 21a reads $$yUL,de,m=sqrt(\alpha wc,g)hUL,de,m\hat{h}DL,de,m+nUL,de,m. \quad (3)$$

The BS 20 estimates (i.e. the processing/calculating means 24) the (m,m)th entry of $\Psi$ as $$[\Psi est]mm=sqrt(\alpha wc,g)/yUL,de,m \approx [\Psi]mm/ade$$

where the approximation holds for high SNRUL, ca and SNRDL, ca values. Thus, with the knowledge of $\{\alpha wc,1, \alpha wc,2, \ldots, \alpha wc,G\}$ at the BS, the entries of Test correspond to the respective entries of $\Psi$ scaled by 1/ade and calibration holds. Here, the physical channel has to remain constant within the DL and UL phase transmissions of each group to ensure efficient calibration, but it can change from a group to another.

Another benefit of this approach compared to the one of "part I" is the transmit power enhancement in the UL calibration phase; namely, G UL signals are sent with the maximum power in comparison to only 1 in the approach of "part I". This results in a more accurate calibration, as also confirmed by numerical results. Below, the main points of the proposed method are summarized:

G=1: The inverse channels sent to all antennas are normalized by a unique factor. The feedback of the given factor is not necessary.

G<M: Some of the inverse channels will be sent with less than the maximum allowed transmit power in the UL.

G=M: Each inverse channel is normalized by a different factor depending on the given channel. This ensures best performance as each inverse channel is then sent with the maximum allowed power, at the expense of extra signaling overhead (feedback of M factors necessary).

G can be selected based on, e.g., the maximum allowed signaling overhead or the number of free resources.

Discussion on the Dedicated UE

Due to the ever increasing number of connected UEs and network densification, a UE 10 close to the BS 20 and experiencing a high SNR should be easy to find. This UE 10 can be in idle state before calibration starts, i.e., it does not have to be initially involved in data transmission or reception. It can be scheduled to perform the calibration (consisting of the DL phase, UL phase, and feedback of normalization parameters) with the BS and return to the idle state afterward. The BS hardware chains matrix $\Psi$ changes much slower (namely, in the order of minutes) than the physical channel due to its dependence on, e.g., temperature changes of the hardware elements. Therefore, the calibration procedure has to be performed once every few minutes only. As the whole calibration process can be performed within tens of milliseconds, the corresponding signaling only occupies a very small fraction of the available time-frequency resources.

An alternative implementation of the dedicated UE 10 for calibrating the hardware chains at the BS 10 is a UE (e.g. with minimal functionalities) or a terminal module consisting of at least RF and baseband parts, mounted at a fixed position not far away from the BS, or integrated into the BS, and may not be involved in personal telephony or data transmission. Since a UE is a mass product and its cost is negligible to that of a BS, this provides a cost-efficient solution.

In comparison to the state of the art, the present invention considerably improves the calibration accuracy, the resulting DL CSI accuracy, and corresponding MIMO gains. It allows for transmission of higher-order modulation schemes (e.g., 256 QAM). Other methods are either costly in terms of overhead or hardware, or inapplicable to practical systems, or have assumptions that are not in line with practical systems.

The invention has been described in conjunction with various embodiments and implementation examples herein. However, other variations to the disclosed embodiments and examples can be understood and effected by those skilled in the art and practicing the claimed invention, from a study of the drawings, the disclosure and the appended claims. In these claims, the word "comprising" does not exclude other elements or steps and the indefinite article "a" or "an" does not exclude a plurality. A single processor, processing means or another unit or entity may fulfill the function of several items recited in the claims. The mere fact that certain measures are recited in mutually different dependent claims does not indicate that a combination of these measures cannot be used to advantage. For example, the functionalities of the base station according to the invention and the terminal according to the invention could be combined to a respective system combining such a base station and a terminal, as well as a combined method with functionalities performed by and in the terminal and the base station as well as the exchange of signals information between them. A computer program may be stored/distributed on a suitable medium, such as an optical storage medium or a solid state medium supplied together with or as part of other hardware, but may also be distributed in other forms, such as via the Internet or other wired or wireless telecommunication systems.

What is claimed is:

1. A method for obtaining uplink calibration values in a terminal of a wireless communication system to enable a Base Station (BS) having a number of antennas to determine a respective hardware chain value for each antenna of the number of antennas, the method comprising:
obtaining, by the terminal, a downlink channel estimate value for each antenna, and determining a downlink channel estimate value with a lowest signal power, wherein the number of antennas are divided into groups;
obtaining, by the terminal, a different normalization value for each group of antennas based on the downlink channel estimate value with the lowest signal power within each group;
obtaining, by the terminal, an uplink calibration value for each antenna on the basis of the downlink channel estimate value for each antenna and the different normalization value for each group;
transmitting, by the terminal, the obtained uplink calibration value for each antenna to the BS; and
signaling, by the terminal, the obtained different normalization value for each group to the BS, wherein the BS further obtains the respective hardware chain value for each antenna from the received uplink calibration value and the obtained different normalization value.

2. The method according to claim 1, further comprising:
receiving, by the terminal, a pilot signal on a downlink channel for each antenna from the BS, and
obtaining, by the terminal, the downlink channel estimate value for each antenna from the received pilot signal.

3. The method according to claim 1, wherein the normalization value is calculated by the terminal as a function of maximum transmit power of the terminal and the downlink channel estimate value with the lowest signal power.

4. The method according to claim 3, further comprising:
obtaining, by the terminal, the normalization value by multiplying the maximum transmit power of the terminal with a value obtained from the downlink channel estimate value with the lowest signal power.

5. The method according to claim 4, wherein the terminal obtains the value as the squared absolute value of the downlink channel estimate value with the lowest signal power.

6. The method according to claim 1, further comprising:
obtaining, by the terminal, the uplink calibration values for each antenna by multiplying a normalization factor with the inverse of the respective downlink channel estimate value for each antenna, wherein the normalization factor is the square root of the normalization value.

7. The method according to claim 1, wherein the normalization value is the same normalization value for all antennas in the BS.

8. The method according to claim 1, wherein the number of antennas is grouped based on a maximum allowed signaling overhead or a number of free resources.

9. A terminal for a wireless communication system, adapted to obtain uplink calibration values to enable a Base Station (BS), having a number of antennas to determine a respective hardware chain value for each antenna of the number of antennas, the terminal comprising:
a processor, configured to:
obtain, a downlink channel estimate value for each antenna, and determine a downlink channel estimate value with a lowest signal power, wherein the number of antennas are divided into groups;
obtain a different normalization value for each group of antennas based on the downlink channel estimate value with the lowest signal power within each group;
obtain an uplink calibration value for each antenna on the basis of the downlink channel estimate value for each antenna and the different normalization value for each group;
a transmitter, configured to cooperate with the processor to transmit the obtained uplink calibration value for each antenna to the BS; and signal, the obtained different normalization value for each group to the BS, wherein the BS further obtains the respective hardware chain value for each antenna from the received uplink calibration value and the obtained different normalization value.

10. The terminal according to claim 9, wherein the terminal is a User equipment (UE) for the wireless communication system.

11. The terminal according to claim 9, wherein the terminal is either integrated into the BS or co-located with the BS and exclusively adapted to obtain the uplink calibration values.

12. The terminal according to claim 9, wherein the number of antennas is grouped based on a maximum allowed signaling overhead or a number of free resources.

13. The terminal according to claim 9, wherein:
the transmitter is further configured to receive a pilot signal on a downlink channel for each antenna from the BS, and
the processor is further configured to obtain the downlink channel estimate value for each antenna from the received pilot signal.

14. The terminal according to claim 9, wherein the normalization value is calculated by the terminal as a function of maximum transmit power of the terminal and the downlink channel estimate value with the lowest signal power.

15. The terminal according to claim 14, wherein the processor is further configured to:
obtain the normalization value by multiplying the maximum transmit power of the terminal with a value obtained from the downlink channel estimate value with the lowest signal power.

16. The terminal according to claim 15, wherein the terminal obtains the value as the squared absolute value of the downlink channel estimate value with the lowest signal power.

17. A Base Station (BS), having a number of antennas divided into a number of groups of antennas, the BS comprising:
a receiver, configured to cooperate with a processor to receive an uplink calibration signal from a terminal, the uplink calibration signal comprising an uplink calibration value for each antenna and a different normalization value for each antenna group, wherein the uplink calibration value is obtained from a downlink channel estimate value for each antenna and the different normalization value for each antenna group; the different normalization value for each antenna group is obtained from a downlink channel estimate value with a lowest signal power within each group, and
the processor, configured to process each received uplink calibration value and each received different normalization value into a respective hardware chain value for each antenna of the number of antennas.

18. The BS according to claim 17, wherein the number of antennas is grouped based on a maximum allowed signaling overhead or a number of free resources.

19. A calibration method for determining hardware chain values in a Base Station (BS), having a number of antennas grouped in a number of groups, wherein a respective hardware chain value for each antenna of the number of antennas is obtained, the method comprising:

receiving, by the BS, an uplink calibration signal from a terminal, the uplink calibration signal comprising an uplink calibration value for each antenna and a different normalization value for each group of antennas, wherein the uplink calibration value is obtained from a downlink channel estimate value for each antenna and the different normalization value for each antenna group; the different normalization value for each antenna group is obtained from a downlink channel estimate value with a lowest signal power within each group, and processing, by the BS, each received uplink calibration value and each received different normalization value into the respective hardware chain value for each antenna.

20. The method according to claim 19, wherein the number of antennas is grouped based on a maximum allowed signaling overhead or a number of free resources.

* * * * *